United States Patent
Varnas et al.

(10) Patent No.: US 8,210,679 B2
(45) Date of Patent: Jul. 3, 2012

(54) ARRAY OF PROGRESSIVE OPHTHALMIC LENS ELEMENTS

(75) Inventors: Saulius Raymond Varnas, Brighton (AU); Ray Steven Spratt, Petaluma, CA (US)

(73) Assignee: Carl Zeiss Vision Australia Holdings Limited, Lonsdale (AU)

( * ) Notice: Subject to any disclaimer, the term of this patent is extended or adjusted under 35 U.S.C. 154(b) by 797 days.

(21) Appl. No.: 11/913,575

(22) PCT Filed: May 5, 2006

(86) PCT No.: PCT/AU2006/000585
§ 371 (c)(1),
(2), (4) Date: Feb. 6, 2009

(87) PCT Pub. No.: WO2006/116820
PCT Pub. Date: Nov. 9, 2006

(65) Prior Publication Data
US 2009/0290125 A1 Nov. 26, 2009

(30) Foreign Application Priority Data

May 5, 2005 (AU) .................... 2005902269

(51) Int. Cl.
*G02C 7/06* (2006.01)

(52) U.S. Cl. ............ 351/169; 351/177; 351/159
(58) Field of Classification Search .......... 359/159, 359/168–169; 351/159, 168–169, 177
See application file for complete search history.

(56) References Cited

U.S. PATENT DOCUMENTS

| 6,793,340 B1 * | 9/2004 | Morris et al. ............ 351/169 |
| 2005/0122472 A1 * | 6/2005 | Fisher et al. ............ 351/177 |
| 2005/0270482 A1 * | 12/2005 | Fisher et al. ............ 351/177 |

FOREIGN PATENT DOCUMENTS

| EP | 0880046 A1 | 11/1998 |
| WO | 01/62139 | 8/2001 |
| WO | 01/62139 A1 | 8/2001 |
| WO | WO 03/052491 A1 | 6/2003 |
| WO | 2004/046792 A1 | 6/2004 |

OTHER PUBLICATIONS

Supplementary European Search Report, dated Nov. 12, 2010.

(Continued)

*Primary Examiner* — James Greece
(74) *Attorney, Agent, or Firm* — Buchanan Ingersoll & Rooney PC

(57) ABSTRACT

An array of progressive ophthalmic lens elements is disclosed. The progressive ophthalmic elements contained in the array having substantially the same addition power and substantially the same optical prescription for distance vision. Each of the progressive ophthalmic lens elements has a progressive lens design characterized by a set of parameters defining a distance zone providing a refracting power for distance vision, a near zone providing a refracting power for near vision and a corridor having a refracting power varying from that of the distance zone to that of the near zone. The progressive ophthalmic lens elements provide, for a range of values or categories of at least two lifestyle and/or biometric parameters of lens wearers, different progressive lens designs in which at least two of the lens design parameters each have a respective value or characteristic attributable to, or associated with, a particular value or category of a respective one of the lifestyle and/or biometric parameters.

32 Claims, 9 Drawing Sheets

OTHER PUBLICATIONS

Stefanie Schuldt, "ysis—Naturliches Sehen erleben," Deutsche Optiker Zeitung, May 2004, pp. 38-43, Rupp + Hubrach Optik GmbH, Bamberg, Germany.
Form PCT/ISA/210 (International Search Report) dated Jul. 13, 2006.

Office Action (translation) dated Mar. 17, 2011, issued in corresponding Japanese Patent Application No. 2008-509269.
Chinese Office Action dated Dec. 16, 2011 issued in corresponding Application No. 200680022177.5, with translation, 13 pages.

* cited by examiner

ARRAY OF PROGRESSIVE OPHTHALMIC LENS ELEMENTS

This application claims priority from Australian Provisional Patent Application No. 2005902269 filed on 5 May 2005, and the contents of that application are to be taken as incorporated herein by this reference.

FIELD OF THE INVENTION

The present invention relates to an array of progressive ophthalmic lens elements and in particular to an array of progressive ophthalmic lens elements having progressive lens designs that are attributable to, or associated with, lifestyle and biometric parameters of lens wearers.

BACKGROUND OF THE INVENTION

Conventional progressive addition lenses are one-piece lenses having an upper viewing zone ("the distance zone"), a lower viewing zone ("the near zone"), and a progressive corridor ("the intermediate zone") therebetween which provides a gradual power progression from the distance zone to the near zone without any dividing line or prismatic jump.

Although early progressive ophthalmic lenses were somewhat crude in design, they have consistently improved in performance over the past few decades. The improvement in performance has been a causative factor in significantly increasing patient demand for these categories of lenses to the point where lens dispensers and manufacturers today offer a large number of different progressive lens designs. There is thus available to a dispenser a large number of lens designs that may be dispensed to a wearer.

One way of dispensing a progressive ophthalmic lens element for a lens wearer involves selecting a semi-finished progressive ophthalmic lens element from a series of semi-finished lens elements. Generally speaking, each lens element in a series of semi-finished progressive ophthalmic lens elements has a progressive front surface having a range of progressive surface parameters and a spherical back surface.

Since lens wearer's experience different levels of presbyopia, different designs of semi-finished lens elements are provided for different addition powers, typically from 0.75 D to D in 0.25 D increments (that is, twelve different lens designs for each series). Furthermore, a single product intended as a general purpose solution for presbyopia needs to be able to correct vision for a wide range of prescriptions, typically between −10.00 D and +6.00 D or more. However, since a single base curve can ensure satisfactory optics only over a range of prescription powers much narrower than is required, lens manufacturers typically create a range of lens element series or base curves to satisfy this requirement.

Typically, there may be between four and eight lens series in a progressive addition lens (PAL) product. Again, each series typically includes progressive ophthalmic lens elements, or lens designs, having a particular base curve and a range of addition powers. Thus, and in relation to a dispensing process that starts with the selection of a semi-finished lens element, one prior art process involves selecting a lens element series having a base curve that is recommended for a lens wearer's distance vision requirements, and then selecting, from within that series, a lens element having an addition power that is suitable for a lens wearer. Finally, the selected lens element is then finished, by adding a prescription surface, so as to provide a finished progressive ophthalmic lens element that meets the prescription requirements of the lens wearer.

Unfortunately, progressive ophthalmic lens elements included in a series of semi-finished lens elements are somewhat restricted in that for each "base curve" series, only a single progressive ophthalmic lens element, and thus a single progressive surface design, is available for each addition power. Therefore, the progressive surface of each progressive ophthalmic lens element in the series may not be optimised for a particular lens wearer. Recently, progressive ophthalmic lenses have been developed that are able to be produced by a free-form process that avoids the need to modify a semi-finished lens element. In progressive ophthalmic lenses of this type, the multi-focal and prescription surface may be combined on the same lens surface (for example, the back surface), or different lens surfaces (for example, the front and back lens surfaces).

The selection of a particular progressive ophthalmic lens element from a range of progressive ophthalmic lens elements available for an individual wearer, and the subsequent fitting of the selected lens element to a frame to form spectacles for use by the wearer, are of critical importance to the effectiveness of, and thus the lens wearer's satisfaction with, the resultant spectacles.

Unfortunately, given the large number of progressive ophthalmic lens products on the market and the almost infinite combinations and permutations of the design parameters, and the variety of tasks for which a lens may be used, selecting a lens design (from a dispensers perspective) or designing a lens (from a designers perspective) which is suitable for an individual wearer's needs has proven to be somewhat difficult. Therefore, when selecting a progressive lens for a wearer, many dispensers miss the opportunity to fit a lens which has been selected on the basis of the wearer's needs because they instead fit a favourite, trusted lens design.

It would be useful to provide an array of progressive ophthalmic lens elements having a progressive lens design that is attributable to, or associated with, a value, or category of, a lifestyle and biometric parameters of a lens wearer so as to thereby assist a dispenser to at least recommend a suitable progressive ophthalmic lens element from the array based upon lifestyle and biometric information provided by, or obtained from, a lens wearer.

SUMMARY OF THE INVENTION

In general terms, the present invention is directed to arrangements of progressive ophthalmic lens elements having substantially the same addition power and substantially the same optical prescription for distance vision, but that for a range of values or categories of at least one lifestyle parameter and at least one biometric parameters of lens wearers, have different progressive lens designs in which at least two lens design parameters each have a respective value or characteristic attributable to, or associated with, a particular value or category of a respective one of the lifestyle and biometric parameters.

In an embodiment, the present invention provides an array of progressive ophthalmic lens elements having substantially the same addition power and substantially the same optical prescription for distance vision, each of the progressive ophthalmic lens elements having a progressive lens design characterised by a set of lens design parameters defining:

a distance zone providing a refracting power for distance vision;

a near zone providing a refracting power for near vision; and a corridor connecting the distance and near zones, the corridor having a refracting power varying from that of the distance zone to that of the near zone;

wherein the progressive ophthalmic lens elements provide, for a range of values or categories of at least one lifestyle parameter and at least one biometric parameter of lens wearers, different progressive lens designs in which at least two of the lens design parameters each have a respective value or characteristic attributable to, or associated with, a particular value or category of a respective one of the lifestyle and biometric parameters.

In this specification, references to the term "distance zone" are to be understood to be a reference to a designated zone located in the upper portion of the progressive ophthalmic lens element which is suitable for distance vision. On the other hand, references to the term "near zone" are to be understood to be a reference to a designated zone in the lower portion of the progressive ophthalmic lens element which provides near addition.

Throughout this specification reference will be made to the term "array". For the purposes of this description, references to the term array are not to be construed as being limited to a complete array of physical progressive ophthalmic lens elements as such. Moreover, to the extent that an array is an object that is able to be assembled over a period of time, perhaps in the present case as a result of consecutive dispensing activities, references to "array" throughout this specification are to be understood to include a reference to a partial array or a complete array of progressive ophthalmic lens elements.

As will be appreciated, a partial array may include at least two progressive ophthalmic lens elements that have been dispensed using a dispensing process having the capability to dispense additional progressive ophthalmic lens elements that would, if dispensed, provide additional progressive ophthalmic lens elements for including in an (complete or partial) array according to the present invention. Since such a dispensing process may utilise a partial or complete array containing numerical, graphical or virtual representations of progressive ophthalmic lens elements, an array of progressive ophthalmic lens elements according to the present invention need not be restricted to an array of physical progressive ophthalmic lens elements as such. Indeed, an array of progressive ophthalmic lens elements may include any suitable numerical, graphical or virtual representation of progressive ophthalmic lens elements.

In view of the above, it is to be appreciated that in the context of this specification an "array" may include two or more progressive ophthalmic lens elements that have been, or that are able to be, dispensed—as well as a numerical, graphical or virtual representation of an array of progressive ophthalmic lens elements that are capable of being dispensed by a dispensing system or process that indexes into that array. In this respect, either forms of an array of progressive ophthalmic lens elements may include a collection of progressive ophthalmic lens elements which, for a particular addition power and optical prescription, are identified using a suitable array index.

In an embodiment, groups of arrays of progressive ophthalmic lens elements according to the present invention may be arranged as one or more series of arrays. In an arrangement of this type, each array within a series may contain progressive ophthalmic lens elements having an addition power that is different from the addition power of the progressive ophthalmic lens elements contained in the other arrays of the same series, but have substantially the same optical prescription for distance vision. Thus, in an embodiment a series provides a range of addition powers suitable for a range of lens wearers. Thus, another embodiment of the present invention provides a series of progressive ophthalmic lens elements having substantially the same optical prescription for distance vision, the ophthalmic lens elements including:

a distance zone providing a refracting power for distance vision;

a near zone providing a refracting power for near vision; and a corridor connecting the distance and near viewing zones, the corridor having a refracting power varying from that of the distance zone to that of the near zone;

the series including:

plural arrays of progressive ophthalmic lens elements, each array within a series containing progressive ophthalmic lens elements having substantially the same addition power and distance vision prescription, progressive ophthalmic lens elements from different arrays of a series having a different addition power;

wherein the progressive ophthalmic lens elements within an array provides, for a range of values or categories of at least one lifestyle parameter and at least one biometric parameter of lens wearers, different progressive lens designs in which at least two of the lens design parameters each have a respective value or characteristic attributable to, or associated with, a particular value or category of a respective one of the lifestyle and biometric parameters.

In an embodiment, different series of arrays may be grouped so as to provide a matrix containing plural series of arrays. Thus, the present invention also provides a matrix of progressive ophthalmic lens elements, the ophthalmic lens elements including an:

a distance zone providing a refracting power for distance vision;

a near zone providing a refracting power for near vision; and a corridor connecting the upper and near zones, the corridor having a refracting power varying from that of the distance zone to that of the near zone;

the matrix including:

plural series of progressive ophthalmic lens elements, each series containing one or more arrays of progressive ophthalmic lens elements having substantially the same optical prescription for distance vision, each array within a series containing progressive ophthalmic lens elements having substantially the same addition power, progressive ophthalmic lens elements from different arrays of a series having a different addition power;

wherein the progressive ophthalmic lens elements within an array provide, for a range of values or categories of at least one lifestyle parameter and at least one biometric parameter of lens wearers, different progressive lens designs in which at least two of the lens design parameters each have a respective value or characteristic attributable to, or associated with, a particular value or category of a respective one of the lifestyle and biometric parameters.

Preferably, the at least two more lens design parameters of the progressive lens design that are attributable to a value, or category, of a lifestyle and/or biometric parameter of a lens wearer are selected from:

a. distance-near zone size balance;
b. corridor length;
c. near reference point inset (NRP); and
d. foveal-peripheral zone size balance.

Throughout this specification, references to the term "distance-near zone size balance" are to be understood as a reference to a ratio of the lens surface areas available for clear vision of objects at infinite distance to the lens surface available for viewing objects at the lens wearer's typical reading distance. It will be appreciated that these areas are limited by the contours of troublesome blur threshold obtainable by ray tracing a lens for the wearer's prescription and particular eye-lens configuration.

References to the term "near reference point inset" throughout this specification are to be understood to as a reference to a horizontal distance between a vertical major reference point bisector of the distance zone and a vertical major reference point bisector of the near zone.

References to the term "corridor length" throughout this specification are to be understood to be reference to a difference between the Y-coordinates of the fitting cross of the progressive ophthalmic lens and the near reference point on the lens surface.

Preferably, one of the at least one lifestyle parameter of a lens wearer includes a value or category of any one of a lens wearer's:

a. near vision demand;
b. dynamic vision demand;
c. frequency of computer use; and
d. work and/or leisure patterns of the wearer.

Preferably, the value, or category of the at least one biometric parameter of a lens wearer includes a value or category of any one of a lens wearer's:

a. monocular interpupillary distance;
b. reading distance; and
c. visual behavioural patterns of a wearer, including a wearer's head movement and/or eye movement category during a reading task.

In an embodiment, each progressive ophthalmic lens element contained in an array is characterised in accordance with substantially the same position of wear (POW) characteristics. In this respect, the position of wear characteristics may include any one of:

a. corneal back vertex distance;
b. pantoscopic frame tilt and wrap angles; and
c. monocular pupillary distance.

In another embodiment, each progressive ophthalmic lens element contained in an array includes a progressive lens design characterised by a parameter having a value or characteristic that is attributable to, or associated with, frame size and/or shape information of a frame for supporting the progressive ophthalmic lens elements for wearing by a lens wearer.

Another embodiment also provides a method of dispensing a progressive ophthalmic lens for a lens wearer, the method including:

obtaining a value or category for at least two lens design parameters of a lens wearer, the at least two parameters including at least one lifestyle parameter and at least one biometric parameters;

indexing the obtained values or categories into an array of progressive ophthalmic lens designs, each design having substantially the same addition power and substantially the same optical prescription for distance vision, each design including at least two lens design parameters having a respective value or characteristic associated with a particular value or category of a respective one of the lifestyle and biometric parameters; and retrieving from the array a progressive lens design having the two lens design parameters with values or characteristics associated with the obtained values or categories.

In another embodiment there is provided a system for dispensing a progressive ophthalmic lens design for a lens wearer, the system including:

a processor;
a memory programmed with a sequence of instructions for execution by the processor;
a user input device;
a user output device; and
wherein the instructions are executable by the processor to:

accept, via the user input device, a value or category for at least two parameters of a lens wearer, the parameters including at least one lifestyle and at least one biometric parameter;

index the values or categories into an array of progressive ophthalmic lens elements designs having substantially the same addition power and substantially the same optical prescription for distance vision, each design including at least two lens design parameters having a respective value or characteristic associated with a particular value or category of the lifestyle and biometric parameters;

retrieve, from the array, the progressive lens design having a progressive lens design including a value for each of the two lens design parameters associated with the entered values or categories of the lifestyle and biometric parameters of the lens wearer; and output, via the user output device, the selected progressive lens design.

In yet another embodiment, there is provided a computer readable medium storing computer readable data for an array of progressive ophthalmic lens element designs, each design having substantially the same addition power and substantially the same optical prescription for distance vision and including at least two lens design parameters having a respective value or characteristic that is associated with a particular value or category of a lifestyle and/or biometric parameter of lens wearers from a range of values or categories of at least one lifestyle parameter and at least one biometric parameter of lens wearers.

It will be recognised that the present invention includes a number of advantages in that the invention is able to be used by a dispenser to select, from an array of progressive ophthalmic lens elements, a progressive ophthalmic lens element having lens design parameters that correspond to lifestyle and/or biometric parameters of a wearer. As a result, a dispenser is able to select a lens element from the array that is suited for the lifestyle and/or biometric parameters of the lens wearer.

General Description of the Invention

In an embodiment, the progressive ophthalmic lens elements included in an array will typically be of a type that is generally referred to as "finished progressive ophthalmic lens elements". In the context of this specification, finished progressive ophthalmic lens elements may include "free-form" progressive ophthalmic lens elements or progressive ophthalmic lens elements that have been produced by some other conventional manufacturing process.

Throughout this specification, reference will be made to the term "progressive surface". References to the term "progressive surface" are to be understood as a reference to a surface of a progressive ophthalmic lens element having surface features that provide, or contribute to, a lens power profile that defines the upper viewing zone (that is, the distance zone), the lower viewing zone (that is, the near zone) and the corridor of a progressive ophthalmic lens element.

The progressive lens design of a progressive ophthalmic lens element may be represented using a contour diagram that illustrates the distribution of contours of equal refracting power to thereby provide a graphical representation of the distribution of the refracting power provided by a particular lens design.

As will be appreciated, a progressive ophthalmic lens element may include a single progressive surface having surface features that provide the lens power profile of that progressive ophthalmic lens element. However, it is not essential that a progressive ophthalmic addition lens include a single progressive surface. For example, a progressive ophthalmic lens element may include two progressive surfaces that are arranged so that each surface includes surface features that contribute to the lens power profile. In such a case, an optical combination of the progressive surfaces may provide the lens power profile for that progressive ophthalmic lens element.

The progressive lens design of a progressive ophthalmic lens element that includes a single progressive surface may include the progressive surface on either a front surface or a back surface of the progressive ophthalmic lens element. As will be appreciated, the "back surface" of a progressive ophthalmic lens element is, in use, the eye-facing surface, whereas the "front surface" is on the object side of the progressive ophthalmic lens element.

In relation to progressive ophthalmic lens elements that include two progressive surfaces, and as described previously, the lens power profile of a progressive lens design may be provided by the optical combination of surface features of the front and back surfaces of a progressive ophthalmic lens element.

In an embodiment where the progressive ophthalmic lens elements include a single progressive surface, each progressive ophthalmic lens element may also include a separate prescription surface for providing the optical correction corresponding with an optical prescription of a lens wearer. In such an embodiment, the progressive surface and the prescription surface will be located on different surfaces of the progressive ophthalmic lens element. For example, in one embodiment the progressive surface is located on the front surface of each progressive ophthalmic lens element and the prescription surface is located on the back surface. However, in another embodiment, the progressive surface is located on the back surface and the prescription surface on the front surface.

Of course, it is not essential that each progressive ophthalmic lens element include separate progressive and prescription surfaces. Indeed, in one embodiment the surface features of a progressive ophthalmic lens element are arranged on a single surface that provides the lens power profile and an optical correction corresponding with the optical prescription of a lens wearer. In an embodiment including progressive ophthalmic lens elements in which the surface features that provide the lens power profile and the optical correction are arranged on the same surface, the surface features may be arranged on the front surface or on the back surface of each progressive ophthalmic lens element in an array.

In yet another embodiment, the front and back surfaces each include surface features that optically combine to provide the a lens power profile and the optical correction corresponding with the optical prescription of a lens wearer. In other words, in one embodiment, the surface features are distributed across the front and back surfaces to provide a combination of surface features that provides a particular lens power profile and optical prescription. In an embodiment including progressive ophthalmic lens elements in which the surface features that provide the lens power profile and the optical correction are distributed across the front and back surfaces, the surface features may be distributed between those surfaces using any suitable distribution.

Irrespective of the actual arrangement of the progressive and the prescription surfaces, or the distribution and arrangement of the surface features that provide or contribute to the lens power profile and the optical correction, each array of progressive ophthalmic lens elements will contain progressive ophthalmic lens elements having substantially the same optical prescription for distance vision and substantially the same addition power. However, and in relation to an embodiment that includes a series of progressive ophthalmic lenses in the form of a group of arrays, progressive ophthalmic lens elements from different arrays of the same series will have a different addition power but the same optical prescription for distance vision.

The difference in the addition power between each array of progressive ophthalmic lens elements within the same series may vary incrementally so that the plural arrays within a series combine to provide a range of addition powers. In an embodiment, the addition power varies incrementally over a range from 0.75 D to 3.5 D in 0.25 D increments, and for each value there is a corresponding array of progressive ophthalmic lens elements having that value of addition power. However, it will be appreciated that in other embodiments of the present invention, other ranges of addition power and other increments may be provided.

Progressive ophthalmic lens elements from different arrays, or different series, may have progressive lens design in which the at least two lens design parameters are attributable to, or associated with, one or more particular values, or categories, of the same respective lifestyle and biometric parameters. However, since each of those progressive lens designs will be from a different array, or a different series, each of those progressive lens designs will have a different addition power (in the case of different arrays), or a different optical prescription for correcting distance vision (in the case of different series). For example, in one embodiment, progressive ophthalmic lens elements from different series, have a different optical prescription for distance vision. In another example, progressive ophthalmic lens elements from different arrays have a different addition power.

Within an array, a relationship between the value or characteristic of the at least two lens design parameters of the progressive lens design and the value, or category, of respective lifestyle and biometric parameters of lens wearers may be characterised using any suitable approach. One suitable approach may involve varying the value or characteristic of the at least two lens design parameters of the progressive lens design of the progressive ophthalmic lens elements within an array as a function a range of values or categories of the respective lifestyle and biometric parameters of lens wearers. Accordingly, in one embodiment the lens power profile of each progressive ophthalmic lens elements within an array may be derived from the values, or categories, of the respective lifestyle and biometric parameter of a lens wearer.

Another suitable approach may involve incrementally varying, for each progressive ophthalmic lens element in a series, the value or characteristic of each of the at least two lens design parameters of the progressive lens design so that, for progressive ophthalmic lens elements within a series, the at least two lens design parameters vary incrementally over a range of values, or categories, of respective lifestyle and biometric parameters of a population of lens wearers.

Yet another suitable approach may involve proportionally varying, for each progressive ophthalmic lens element within a series, the value or characteristic of each of the at least two lens design parameters of the progressive lens design so that, for progressive ophthalmic lens elements within a series, the at least two lens design parameters vary proportionally over a range of values, or categories, of lifestyle and biometric parameters of a population of lens wearer whilst another parameter remains substantially constant. For example, in one embodiment a distribution of peripheral blur parameter may be kept substantially constant and a parameter of the ratio of the distance zone angular size to the near zone angular size may be varied by approximately more than 10% between consecutive values, or categories, of lifestyle and biometric parameters of a lens wearer.

As will be appreciated, for each lifestyle or biometric parameter there will be a range of variation in a population of lens wearers. Accordingly, in one embodiment of the present invention the progressive ophthalmic lens elements, within an array, in which the at least two lens design parameters are varied so as to provide a range of lens power profiles that correspond with the range of the variation of the respective lifestyle and biometric parameters for a population of lens wearers.

In an embodiment, the distance-near zone size balance has value or characteristic that is attributable to, or associated with, a lens wearer's near vision demand score. According to this embodiment, the range of variation of the value of distance-near zone size balance may be derived from known performances of progressive lens design having different zone sizes in the market place and the outcomes of clinical trials of selected progressive lens designs.

In one embodiment, the range of variation of the value of the distance-near zone size balance is provided by modifying the angular size of the distance and/or near zone.

The angular size of the distance zone may be modified by rotating intersecting asymptotes of a hyperbola fitted to the root mean squared (RMS) blur ray traced for the infinite object distance contour equal to the dioptric value of a quarter of the nominal addition power over a range of +20° to −16° to thereby increase or decrease the angular size of distance zone. In an embodiment, modifying the near zone boundary is achieved by rotating asymptotes of a hyperbola fitted to the root mean squared (RMS) blur ray traced for a particular reading distance of the lens wearer of a particular nominal addition power over a range of +20° to −16° to thereby increase or decrease the angular size of the near zone.

The above described rotations may be mapped linearly to a range of near vision demand values that classify different lens wearers according to the extent to which they are near or distance dominant. For example, a near distance dominant wearer may receive a score of "9", whereas a distance dominant lens wearer may receive a score of "0". A higher score may indicate that a lens wearer is engaged primarily in near-oriented vision tasks. Thus, a progressive ophthalmic lens element having a value or characteristic of distance-near zone size balance that is attributable to, or associated with, a near vision demand score may have a value or characteristic of distance-near zone size balance for a "high" near vision demand score that provides a larger near zone for enhanced near utility. Conversely, a progressive ophthalmic lens element corresponding with a "low" near vision demand score may have an enhanced distance zone. In an embodiment, each score is associated with a unique rotation within the range of rotations. In one embodiment, the range of scores may correspond with a range of rotations in the range of +20° to −16° in 4° increments.

In an embodiment, the angular size of the distance zone is varied over a range from about 105° to about 140°. Preferably, the angular size of the near zone size is varied over a range from about 40° to about 75°. In this respect, the "angular size" of the distance zone may be calculated by fitting a hyperbola to the root mean squared (RMS) blur ray traced for the infinite object distance contour equal to the dioptric value of a quarter of the nominal addition power and measuring the angle between two asymptotes of this hyperbola. The angular size of the near zone may calculated the same way except that the RMS blur is ray traced for a particular reading distance of the lens wearer of a particular nominal add. In an embodiment, the angular size of the distance zone varies incrementally over the range so that nine increments are provided, each corresponding to about 4° of the angular zone size change per increment. In terms of a proportional variation, and if one were to consider the maximum angular size of the distance zone to be about 180°, an incremental variation of 4° would correspond to about a 2% variation per increment.

In another embodiment, a value or characteristic of foveal-peripheral zone size balance for each of the progressive ophthalmic lens elements in an array is attributable to, or associated with, a value or category of lens wearer head or eye turn tendencies. In this respect, the "foveal zone" of a progressive ophthalmic lens element is a zone of the progressive ophthalmic lens element that is suitable for a clear foveal vision for a lens wearer, whereas the "peripheral zone" includes zones which are not suitable for foveal vision and can only be used for peripheral vision. Thus, the foveal-peripheral zone size balance is the ratio of the lens surface area available for clear foveal vision to the lens surface available for only peripheral vision. The foveal zone will include the lens surface area provided by the combination of the distance zone, the near zone and the corridor, whereas the peripheral zone will include the remaining lens surface area, distributed over two zones, each having a boundary with the distance zone, the corridor and the near zone. For the remainder of this description each of those boundaries will be referred to as a "foveal-peripheral zone boundary".

The suitability of any area on the lens surface of a progressive ophthalmic lens element for foveal vision is determined by the level of blur it produces for a lens wearer when viewing objects at a distance ("the object distance") intended to be viewed through that particular area of the progressive lens. Typically, the calculation of blur in this context requires an assumption about the variation of the object field with coordinates on the lens front surface. Typically, such a calculation is based on an assumption that the object distance varies proportionately to the eye path power profile along the y-axis and is independent of the x-coordinate. Contours plot for this assumed variable object distance can then be calculated, and a contour selected that is representative of a threshold for clear foveal vision.

In terms of attributing, or associating a value or characteristic of foveal-peripheral zone size balance with a value or category of lens wearers eye turn tendencies, a lens wearer's eye turn may be measured for at least one of a range of standardised visual tasks, for example, near, intermediate and distance vision. Task-weighted eye-turn data may then be compared to a standard, preferably based on population models of eye movements of the same tasks. From a position against a population standard an eye-turn score between "0" and "9" is obtained where "0" represents eye turn averages less than or equal to the 10th percentile, and "9" represents eye-turn averages greater or equal to the 90th percentile.

In an embodiment, the value or characteristic of the distance zone and the near zone sizes, and thus the foveal-peripheral zone size balance, of the progressive ophthalmic lens may be attributable to, or associated with, a eye-turn percentile score so that the array provides a range of variation in the foveal-peripheral zone size balance that is derived from the range of eye-turn percentile scores. For example, a minimum absolute foveal zone size (and thus, a minimum foveal-peripheral zone size balance) would be attributable to an eye-turn score of "0" whereas a maximum absolute foveal zone size (and thus, a maximum foveal-peripheral zone size balance) would be attributable to an eye-turn score of "9". Intermediate foveal zone sizes may vary according to a linear mapping between the maximum and minimum foveal zone sizes.

In an embodiment, within an array the near reference point (NRP) inset of the progressive ophthalmic lens elements has a value or characteristic that is attributable to, or associated with, a value or category from a range of monocular interpupillary distances for a population of lens wearers.

In an embodiment, within an array the corridor length of the progressive ophthalmic lens elements has a value or characteristic that is attributable to, or associated with, a frame shape and/or size so as to provide a required reading power at an optimal position inside the frame. In one embodiment, the corridor length may vary according to a fitting height (H) of a frame.

In another embodiment, the corridor length has a value or characteristic that is attributable to, or associated with, the near demand score.

In yet another embodiment, the corridor length has a value or characteristic that is attributable to, or associated with, a value or category of a biometric parameter of lens wearers that classifies lens wearers head movement and/or eye movement tendency.

A lens wearer's head movement and/or eye movement tendency may be measured using an eye tracker or a head tracker so as to derive eye declination data for a standardised reading task. The eye declination data may then be compared to a standard, preferably based on population models of eye declination.

For a particular lens wearer an eye declination score may be derived using their eye declination data measured against the standard for lens wearers. An eye declination score between "0" and "9" may be obtained where a score of "0" represents eye declination averages less than or equal to the 10th percentile, and a score of "9" represents eye declination averages greater or equal to the 90th percentile. Within an array, the value or category of the corridor lengths of the progressive ophthalmic lens may be attributable to, or associated with, the percentile score so that the array provides a range of variation in the corridor length is attributed to, or associated with the range of percentile scores. In one embodiment, the minimum corridor length in the range would be attributable to an eye declination score of "0", whereas the maximum corridor length in the range would be attributable to an eye declination score of "9". Intermediate corridor lengths may vary according to a linear mapping between those maximum and minimum corridor lengths.

In one embodiment, within an array the near reference point inset will have a value or characteristic that is attributable to, or associated with, a value or category of a lens wearer's reading distance. In this way, a pair of progressive ophthalmic lens elements may exist in the array that, when combined to form spectacles, provides an acceptable fusion of images from the left and right eyes of a lens wearer at a reading distance in a vertical plane cutting a line connecting the corridor of the left and right eyes at the mid-point.

As described previously, progressive ophthalmic lens elements from different arrays of the same series, and thus progressive ophthalmic lens elements having a different addition power, but the same optical correction for distance vision, may include progressive lens designs having a respective value or characteristic attributable to, or associated with, a respective value or category from the same range of values or categories of lifestyle and biometric parameters of lens wearers.

In an embodiment in which the at least two lens design parameters of the progressive lens design vary incrementally, the incremental variation may be expressed using any suitable form, possibly depending upon the lens design parameters which are being varied, since different lens design parameters may be expressed differently.

Each of the one or more arrays of progressive ophthalmic lens elements may each contain progressive ophthalmic lens elements, within their respective series, having a progressive lens design including more than two lens design parameters having a respective value or characteristic that is attributable to a value, or category, of a respective lifestyle or biometric parameter of lens wearers.

In a matrix embodiment of the present invention including series of arrays, each series of arrays will correspond to a different optical prescription. In this way, for a particular optical prescription and a particular addition power, a series of arrays of progressive ophthalmic lens elements will exist that contains an array of progressive ophthalmic lens elements having substantially the same optical prescription, substantially the same addition power, and a progressive lens design including at least two lens design parameters having a respective value or characteristic that is attributable to a value, or category, of a respective lifestyle and biometric parameters of particular lens wearers. One example of a structure of a matrix containing series of arrays for different prescriptions is shown in Table 1.

In addition to having substantially the same addition power and substantially the same optical prescription for distance vision, progressive ophthalmic lens elements contained within an array may also be substantially the same in other characteristics. For example in one embodiment, each array may contain progressive ophthalmic lens elements that are adapted for substantially the same position of wear (POW) characteristics.

TABLE 1

Example of a Matrix of Finished Progressive Ophthalmic Lens Elements

| | Addition Power | | | | |
|---|---|---|---|---|---|
| | 0.75D | 1.00D | 1.25D | ... | 3.5D |
| Series 1: Prescription "A" | Array 1A | Array 1B | Array 1C | ... | Array 1n |
| Series 2: Prescription "B" | Array 2A | Array 2B | Array 2C | ... | Array 2n |
| Series 3: Prescription "C" | Array 3A | Array 3B | Array 3C | ... | Array 3n |
| ... | ... | ... | ... | ... | ... |
| Series N: Prescription "N" | Array NA | Array NB | Array NC | ... | Array Nn |

In another embodiment, each series may each include a progressive ophthalmic lens element that is adapted for substantially the same frame design (for example, frame shape and/or size).

Accordingly, in an embodiment where multiple arrays are grouped in a series arrangement, each of the one or more series of arrays of progressive ophthalmic lens elements may contain progressive ophthalmic lens elements that have been optimised for a lens wearer's position of wear and a particular frame design. That is, each array of progressive ophthalmic lens elements may include a progressive lens design that has been optimised for a lens wearer in accordance with the wearer's perception of the lens element as perceived with the lens elements in their intended position, taking into account the influence that oblique aberrations, reading distance, lens tilt, and vertex distance have on the final optical powers of the lens.

Accordingly, in an embodiment each series contains progressive ophthalmic lens elements that provide an optical correction for distance vision that corresponds with a lens wearer's prescription as well as being adapted for a "position of wear" characteristic. An example of a structure of a matrix of progressive ophthalmic lens elements having the same prescription and "position of wear" characteristics is shown in Table 2.

Preferably, since each progressive ophthalmic lens element within an array may correspond to a particular value, or category, of a "position of wear" parameter (that characterises the way in which the lens elements are to be positioned on a wearer's face), in an embodiment of a matrix according to the present invention, a series of progressive ophthalmic lens elements will exist that contains progressive ophthalmic lens elements having a progressive lens design that relates to a value, or category, of lifestyle and biometric parameters of a lens wearer as well as substantially the same position of wear characteristics. Likewise, within an array, the progressive design of the progressive ophthalmic lens elements may be adapted for different frame shapes and/or sizes.

TABLE 2

Example of a Matrix of Progressive Ophthalmic Lens Elements

| | Addition Power | | | | |
|---|---|---|---|---|---|
| | 0.75D | 1.00D | 1.25D | ... | 3.5D |
| Series 1: Prescription "A" and $POW_1$ | Array 1A | Array 1B | Array 1C | ... | Array 1n |
| Series 2: Prescription "B" and $POW_1$ | Array 2A | Array 2B | Array 2C | ... | Array 2n |
| Series 3: Prescription "C" and $POW_1$ | Array 3A | Array 3B | Array 3C | ... | Array 3n |
| ... | ... | ... | ... | ... ... | |
| Series N: Prescription "N" and $POW_1$ | Array NA | Array NB | Array NC | ... | Array Nn |

BRIEF DESCRIPTION OF THE DRAWINGS

The present invention will now be described in relation to a preferred embodiment as illustrated in the accompanying drawings. However, it must be appreciated that the matter illustrated presents only one embodiment of the invention. Other embodiments are envisaged as also being within the scope of the invention as generally described above.

In the drawings.

DETAILED DESCRIPTION OF A PREFERRED EMBODIMENT

Figure 1A:
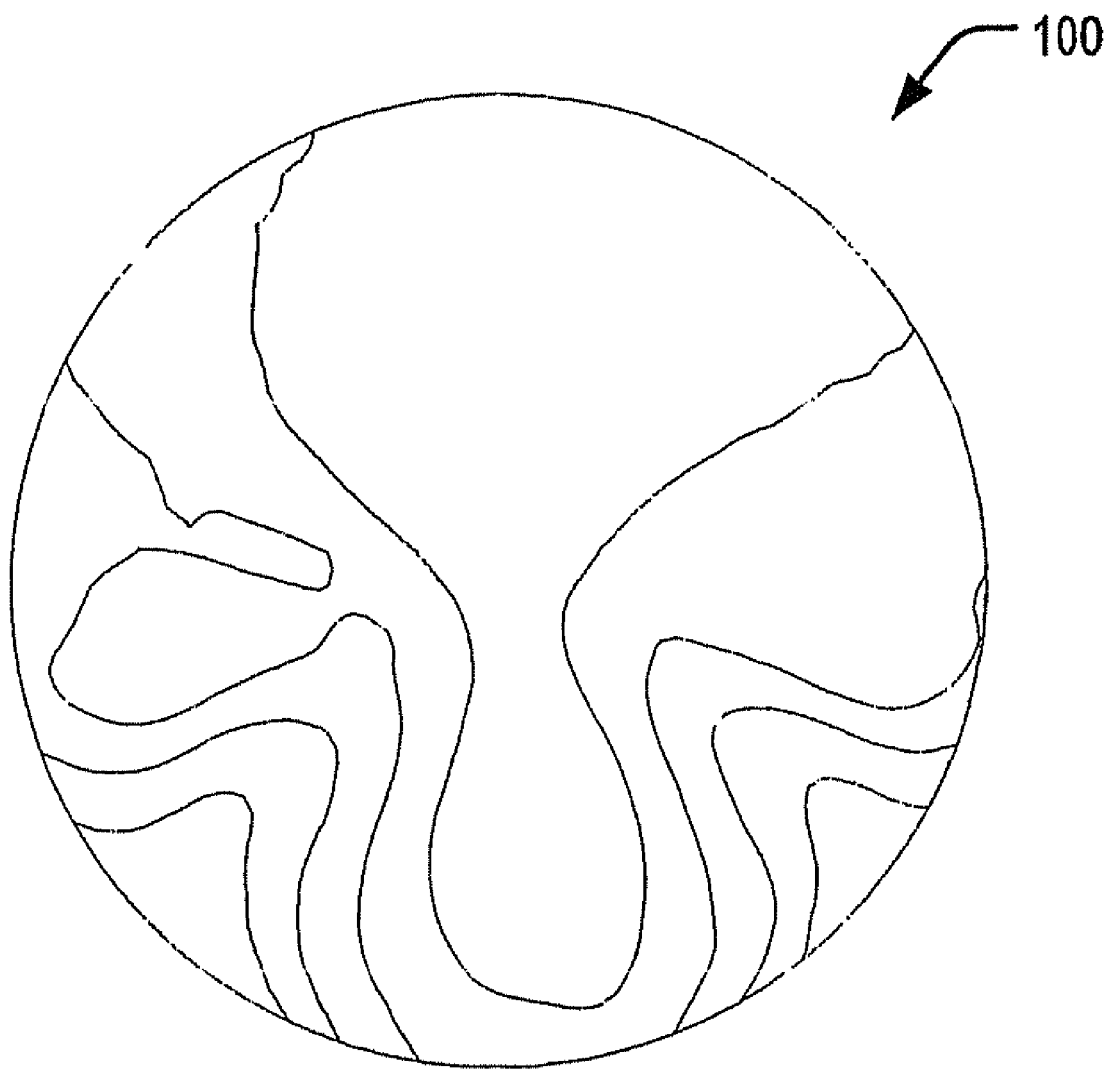
FIG. 1A shows a contour plot of RMS blur of a conventional progressive ophthalmic lens element.

FIG. 1A shows a contour plot of RMS blur in a conventional progressive ophthalmic lens element 100. The progressive ophthalmic lens element 100 provides an Rx of +2.00/−1.50×45° and a 2.00 D addition power. Ray tracing has been carried out for the position of wear characterised by a corneal vertex distance of 12 mm and a pantoscopic tilt of 10°. An implied object field for ray tracing varies from infinity at the distance reference point (DRP) to 40 cm at the near reference point (NRP). A 0.5 D reserve accommodation has been assumed in estimating the power errors in the near zone. The diameter of the illustrated progressive ophthalmic lens element 100 is 60 mm.

Figure 1B:
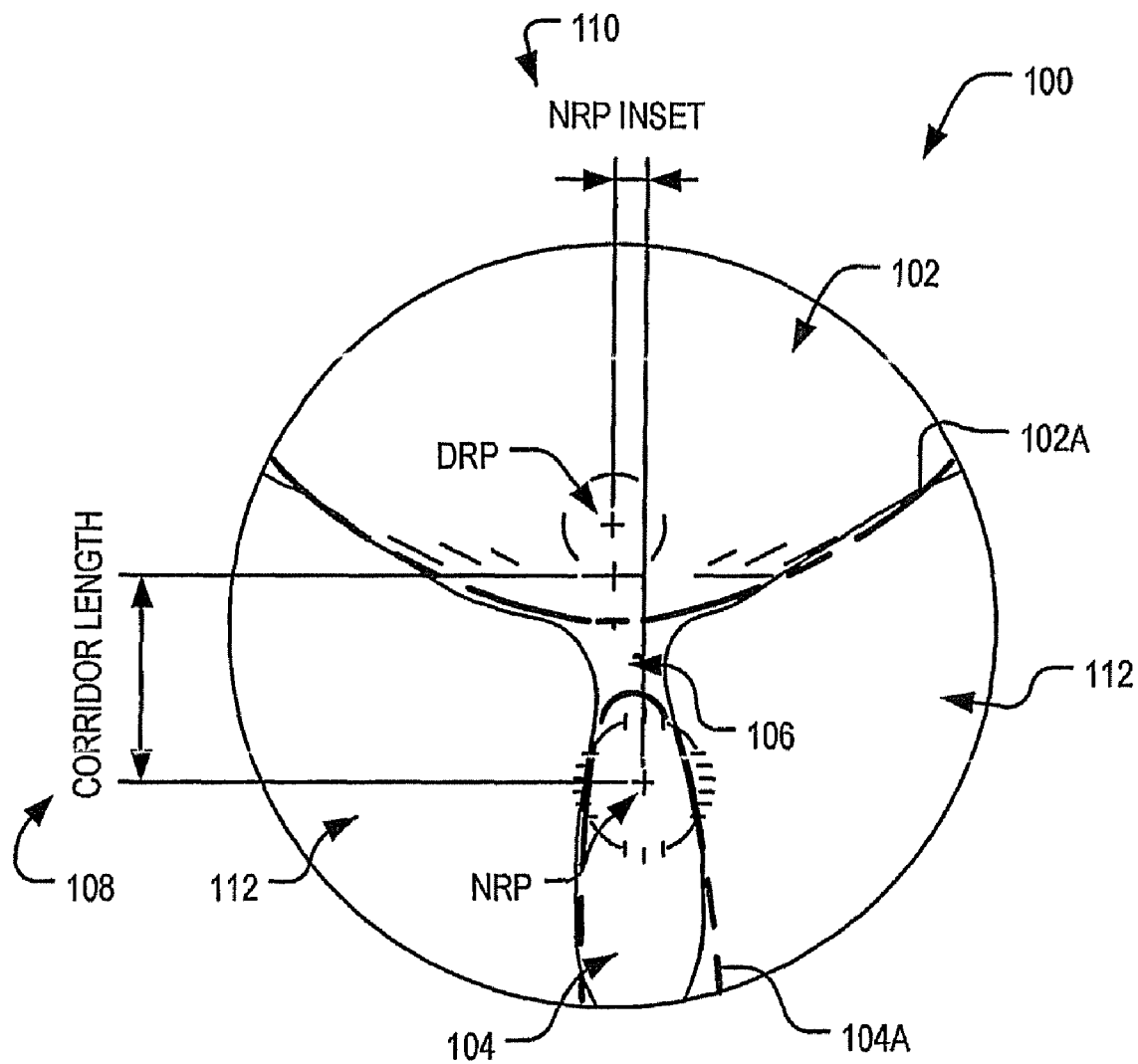
FIG. 1B shows a schematic view of the conventional progressive ophthalmic lens element illustrated with a single contour of RMS blur.

FIG. 1B depicts a schematic view of a progressive ophthalmic lens element 100 having a different progressive lens design to that shown in FIG. 1A. As shown, the progressive ophthalmic lens element 100 includes an upper viewing zone 102 ("the distance zone") for providing a refracting power for distance vision, a lower viewing zone 104 ("the near zone") for providing a refracting power for near vision and a corridor 106 connecting the upper 102 and lower 104 viewing zones. In the present case, the distance zone 102 and the near zone are shown generally as areas of the lens surface bounded by respective hyperbolas 102A, 104A. Hyperbola 102A is fitted to the root mean squared (RMS) blur ray traced for the infinite object distance contour equal to the dioptric value of a quarter of the nominal addition power. Hyperbola 104A is fitted to the same contour of the root mean squared (RMS) blur ray traced for a particular reading distance of the lens wearer of a particular nominal addition power.

The corridor 106 has a refracting power that varies from that of the distance zone 102 to that of the near zone 104 over the corridor length 108. The illustrated progressive ophthalmic lens 100 also includes peripheral zones 112 and a foveal zone that itself includes the distance zone 102, the near zone 104 and the corridor 106.

Figure 2:
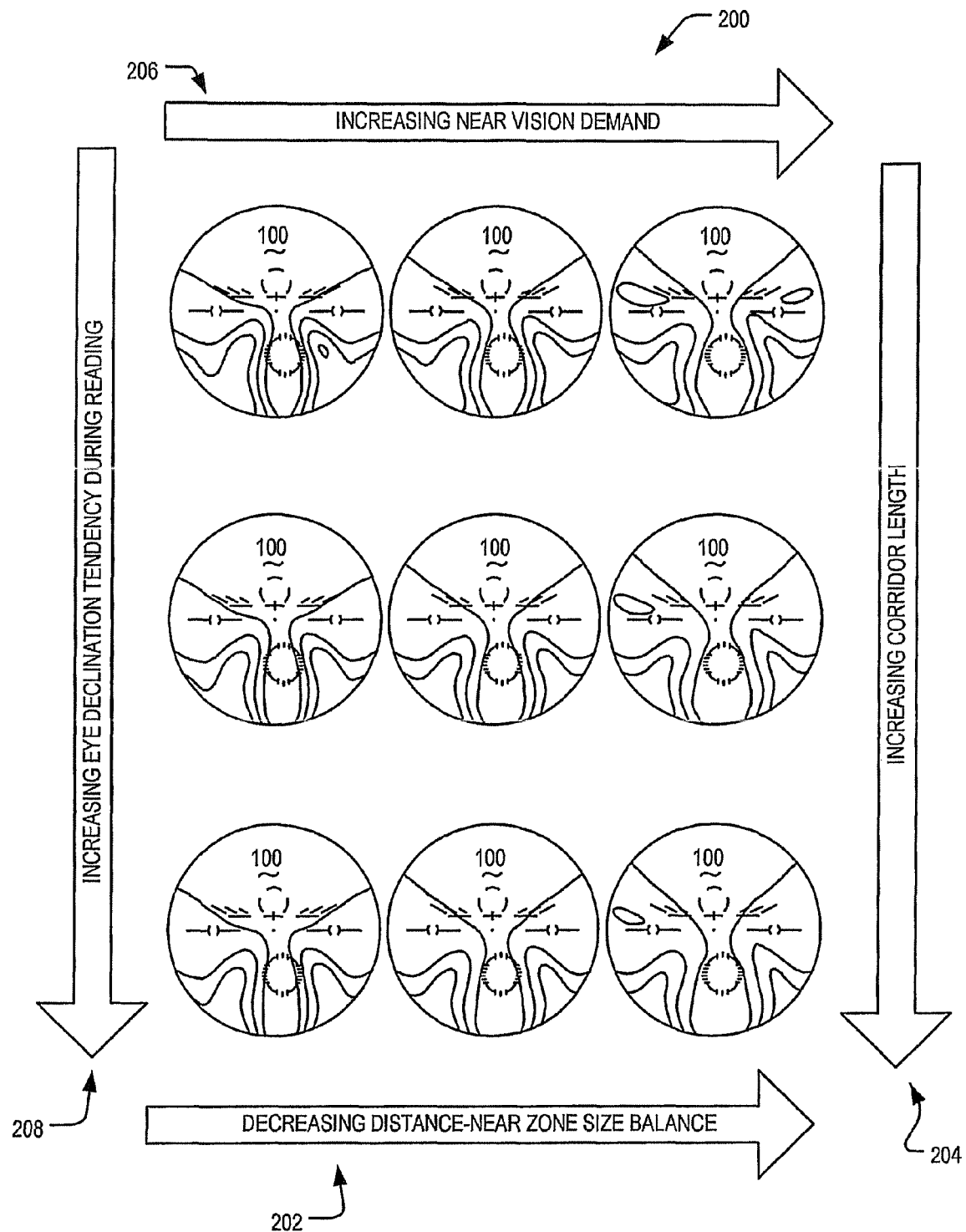
FIG. 2 shows contour plots of RMS blur for progressive ophthalmic lenses arranged in an array according to an embodiment of the present invention.

FIG. 2 shows contour plots of RMS blur for an array 200 of progressive ophthalmic lenses 100 according to an embodiment of the present invention. Reference marks DRP, NRP are shown to aid location of the principal lens power measurement positions.

Each progressive ophthalmic lens elements 100 in the array 200 has substantially the same addition power and substantially the same optical prescription for distance vision, but the progressive ophthalmic lens elements 100 of the array 200 provide, for a range of values or categories of at least one lifestyle parameter and at least one biometric parameter of lens wearers, different progressive lens designs in which at least two of the parameters each have a respective value or category attributable to, or associated with, a particular value or category of a respective one of the lifestyle and biometric parameters.

The progressive ophthalmic lens elements 100 shown in FIG. 2 are represented using contour plots of RMS blur for a variable object distance. The array 200 depicted in FIG. 2 includes nine progressive ophthalmic lens elements 100, each having a different progressive lens design. However, it will be appreciated that any number of progressive ophthalmic lens elements 100 may be included in an array 200.

As described above, each of the progressive ophthalmic lens elements 100 included within the array 200 includes substantially the same optical prescription for distance vision and substantially the same add power prescription. In the present case, each of the progressive ophthalmic lens elements 102 provides a plano distance viewing zone with 2.00 D add.

In the present case, each of the progressive ophthalmic lens elements 100 in the array 200 also provides a progressive design that is characterised by the same position of wear parameters, namely a pantoscopic tilt of 10 degrees, zero degree wrap angle and 12 mm corneal vertex distance. It is not essential that each of the progressive ophthalmic lens elements 100 in the array 200 provides a progressive design that is also characterised by the same position of wear parameters.

As described above, two lens design parameters 202, 204 of each of the progressive ophthalmic lens elements 100 have a respective value or characteristic that is attributable to a value, or category, of respective lifestyle and biometric parameters of lens wearers. In the present case, the two lens design parameters 202, 204 include corridor length 204 and distance-near zone size balance 208.

In the illustrated embodiment, the value of the corridor length 204 is attributable to a category of eye movement (in this case, the eye declination tendency during reading) of lens wearers so that the value of the corridor length 204 increases with increasing eye declination.

Additionally, the value of the distance-near zone size balance 202 is attributable to a category of near vision demand 206 of lens wearers so that the value of the distance-near zone size balance 202 decreases with increasing near vision demand 206. That is, a larger distance-near zone size balance equates 202 with a lower near vision demand 206.

Figure 3:
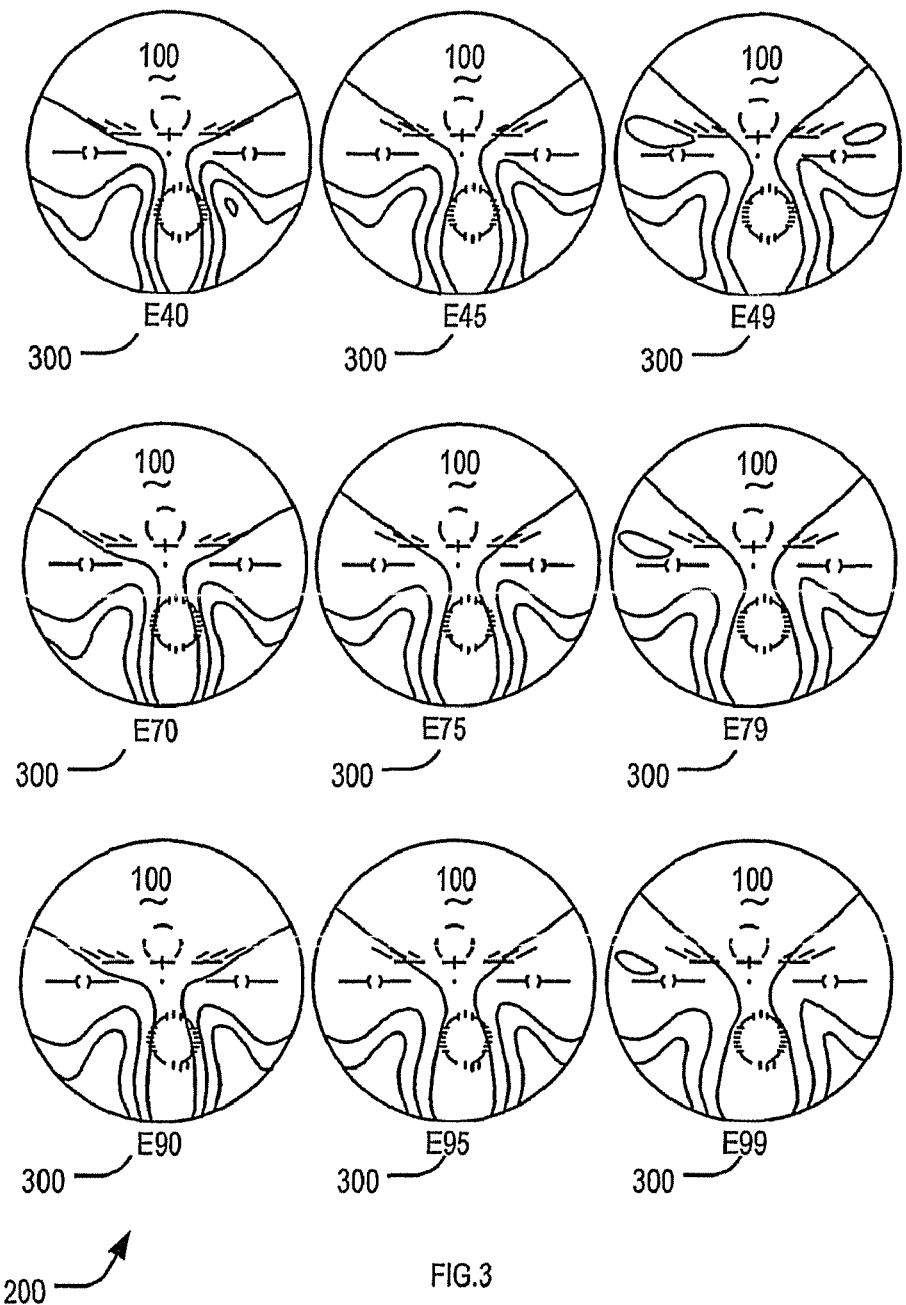
FIG. 3 shows the array of FIG. 2 having progressive ophthalmic lenses associated with a 2-digit array index.

As is shown in FIG. 3, each of progressive ophthalmic lens elements 100 in the array 200 is associated with an individual 2-digit array index 300 that is indicative of the at least two progressive lens design parameters that are attributable to, or associated with, a value, or category, of lifestyle and biometric parameters established for an individual wearer as well as the value or category of those progressive lens design parameters.

Figure 3A:
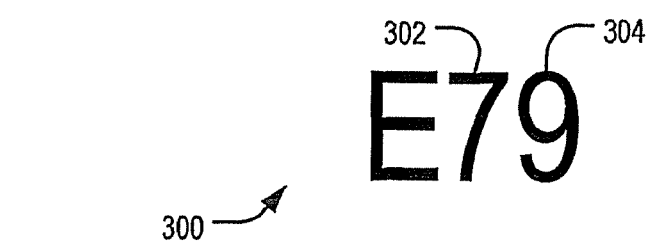
FIG. 3A shows an example of the 2-digit array index of FIG. 3.

In the illustrated embodiment, and referring now to FIG. 3A, a first numerical parameter 302 in the 2-digit code 300 is indicative of a value or category of a value of the corridor length of the progressive lens design and is attributable to a value of an eye declination. In the present case, a larger code number is indicative of a longer corridor length.

The second numerical parameter 304 is indicative of the distance-near zone size balance and is attributable to the near vision demand score.

Figure 4:
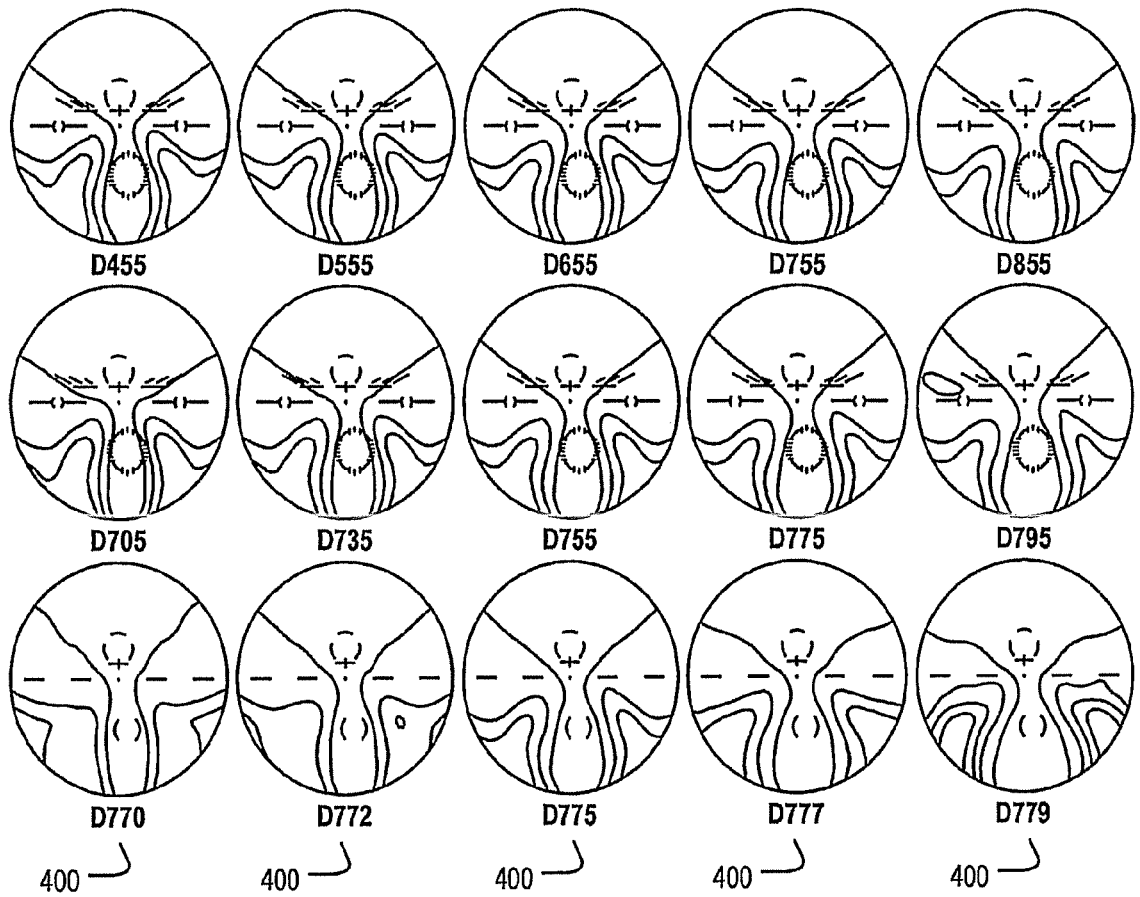
FIG. 4 shows contour plots of RMS blur for another array according to an embodiment of the present invention.
Figure 4A:
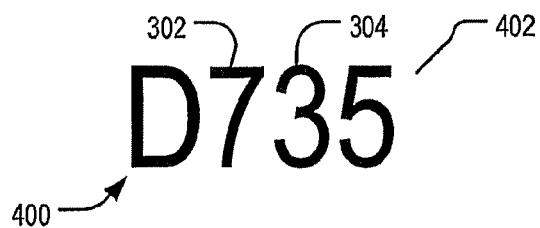
FIG. 4A shows an example of the 3-digit array index for FIG. 4.

It will be understood that other combinations of progressive lens design parameters are possible. Indeed, FIG. 4 illustrates another embodiment of an array according to the present invention. In the embodiment illustrated in FIG. 4, each progressive ophthalmic lens element is associated with a three-digit array index 400. According to this embodiment, and referring to FIG. 4A, a third numerical parameter 402 is provided that is indicative of the foveal-peripheral zone size balance, which in this example is a function of the extent of the lens wearer's natural eye turn before turning the head when attending to objects appearing in the peripheral field.

Figure 5:
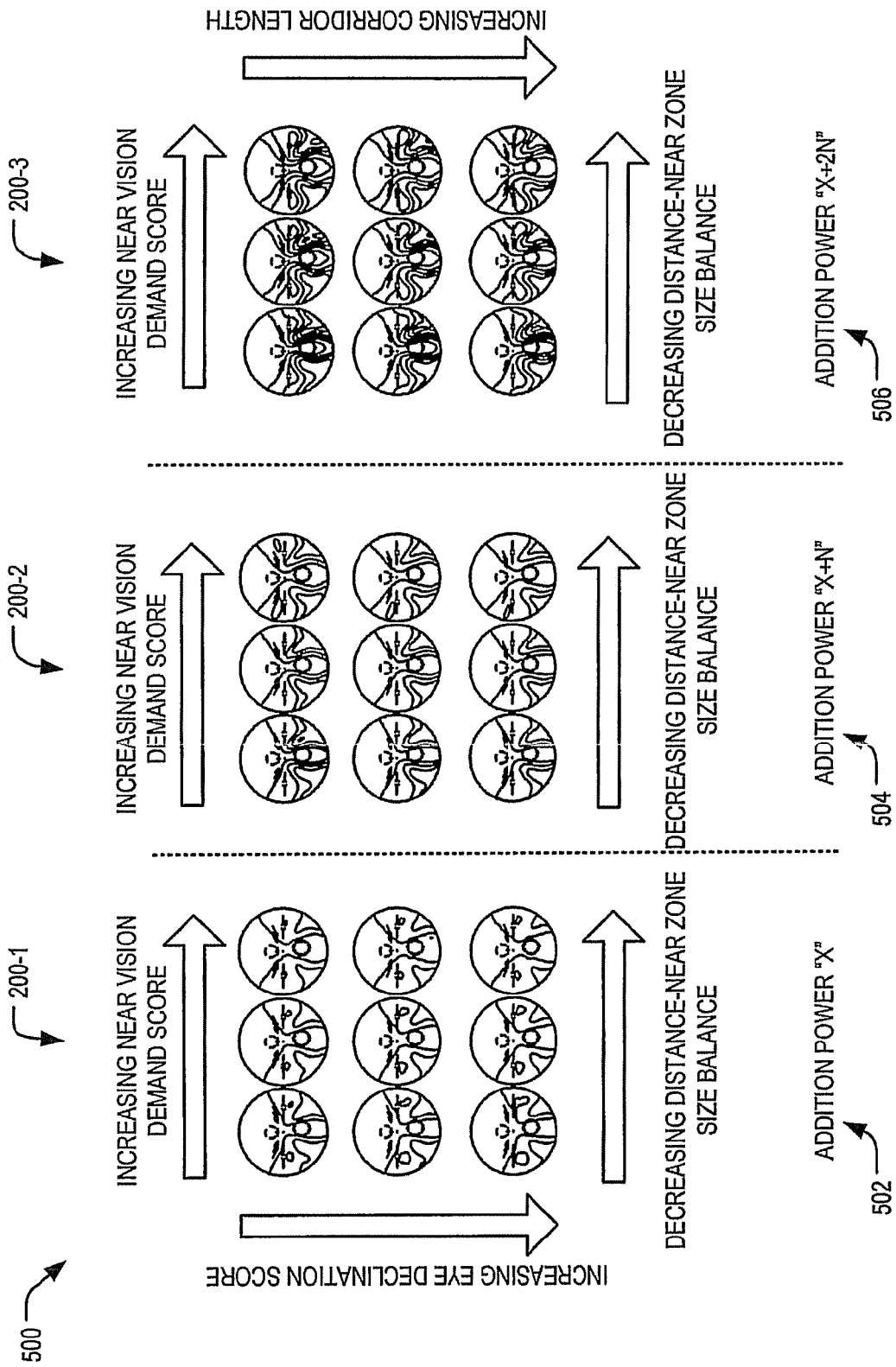
FIG. 5 shows an example of a series embodiment of the present invention.

Turning now to FIG. 5 there is shown contour plots of RMS blur for progressive ophthalmic lenses arranged in a series 500 of arrays 200-1, 200-2, 200-3 of progressive ophthalmic lens elements having substantially the same optical prescription for distance vision. However, progressive ophthalmic lens elements from different arrays 200-1, 200-2, 200-3, have a different addition power 502, 504, 506. In the present case, array 200-1 includes progressive ophthalmic lens elements having an addition power of 1.50 D, array 200-2 includes progressive ophthalmic lens elements having an addition power of 2.00 D, and array 200-3 includes progressive ophthalmic lens elements having an addition power of 2.50 D.

The progressive lens elements of each array 200-1, 200-2, 200-3 provide, for a range of values or categories of at least one lifestyle parameter and at least one biometric parameter of lens wearers, different progressive lens designs in which at least two lens design parameters each have a respective value or characteristic attributable to, or associated with, a particular value or category of a respective one of the lifestyle and biometric parameters. In the present case, the ranges of values includes a range of near vision demand scores and a range of eye declination scores and the respective lens design parameters include distance-near zone size balance and corridor length.

Figure 6:
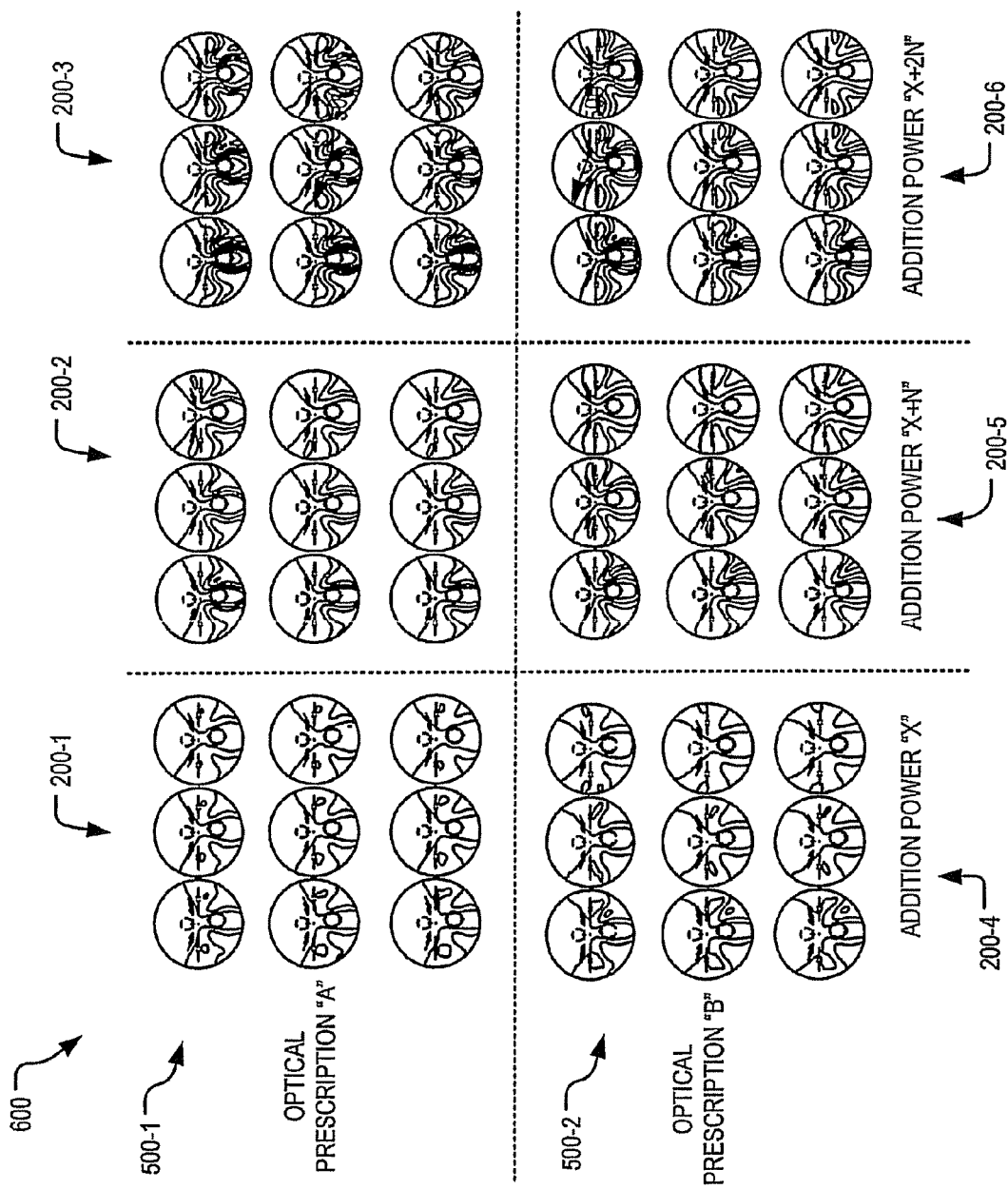
FIG. 6 shows an example of a matrix embodiment of the present invention.
Figure 7:
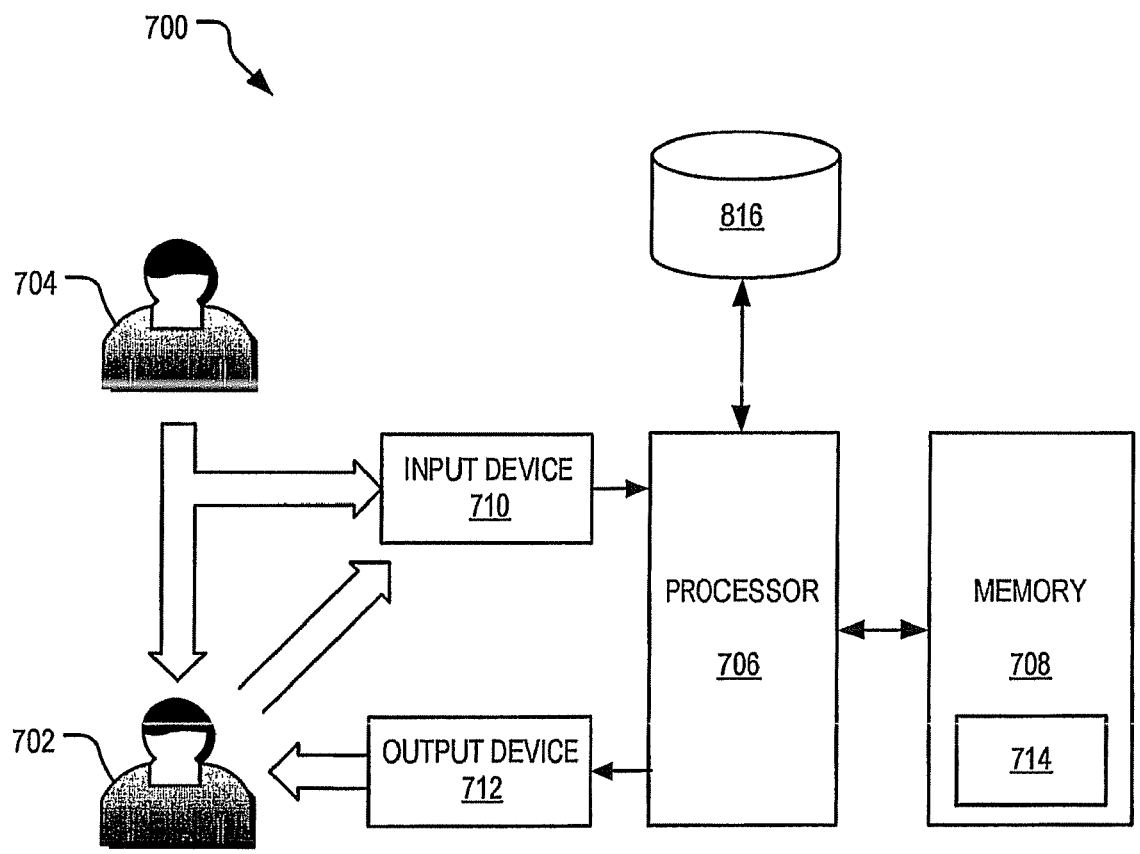
FIG. 7 is a system block diagram of a system in accordance with an embodiment of the present invention.

FIG. 6 shows contour plots of RMS blur for progressive ophthalmic lenses arranged in an matrix according to an embodiment of the present invention. As shown, the matrix 600 includes two series 500-1, 500-2 of progressive ophthalmic lens elements. Each series 500-1, 500-2 contains three respective arrays of progressive ophthalmic lens elements having substantially the same optical prescription for distance vision. In the present case, series 500-1 contains arrays 200-1, 200-2, 200-3 whereas series 500-2 contains arrays 200-4, 200-5, 200-6. In this example, progressive ophthalmic lens elements of series 500-1 provide an optical prescription ("Optical Prescription A") of +0.00 D, whereas progressive ophthalmic lens elements of series 500-2 provide an optical prescription ("Optical Prescription B") of +3.00 D FIG. 7 illustrates a block diagram of an embodiment of a system 700 for implementing a method in accordance with an embodiment of the present invention for use by a dispenser 704 to dispense a progressive ophthalmic lens design for a lens wearer 702.

The illustrated system 700 includes a processor 706, a memory 708, a user input device 710, and a user output device 712. In the present case, the processor 706, the memory 708, user input device 710 and the user output device 712 are integrated into a suitable computing device equipped with an operating system compatible with the processor 706. Examples of suitable computing devices include a desktop computer equipped with Microsoft Windows operating system, a mobile computer (such as a pocket PC, or a laptop computer) equipped with a suitable operating system, or a personal digital assistant (PDA).

As will be appreciated, the type of processor 706 will vary according to the type of computing device, and thus may include, for example, an Intel Pentium type processor, a 68K processor or a custom processor design. The input device 710 includes any suitable device, for example, a touch panel, a keyboard, a keypad, a mouse, a pointer, a track ball. The output device 712 may include, for example, a display terminal.

In the present case, the memory 708 includes dynamic memory, such as RAM. However, in other embodiments the memory 708 may include a PROM, an EPROM, a FLASH PROM, or other memory chip, cartridge or other medium from which the processor 706 can read or write. The memory 708 is programmed with a sequence of instructions 714, in the form of a computer program, for execution by the processor 706.

The instructions 714 are executable by the processor 706 to accept, via the user input device 710, the at least two values or categories of the lifestyle and biometric parameters of the lens wearer 702. The processor 706 then indexes the values or categories into an array of progressive ophthalmic lens designs having substantially the same addition power and substantially the same optical prescription for distance vision. As described above, each lens design includes at least two lens design parameters having a respective value or characteristic associated with a particular value or category of the lifestyle and biometric parameters.

The array may be stored internally in the memory 708, or externally, such as in a database 816 stored on a remote computer and accessible to the processor via a suitable communications link.

Figure 8:
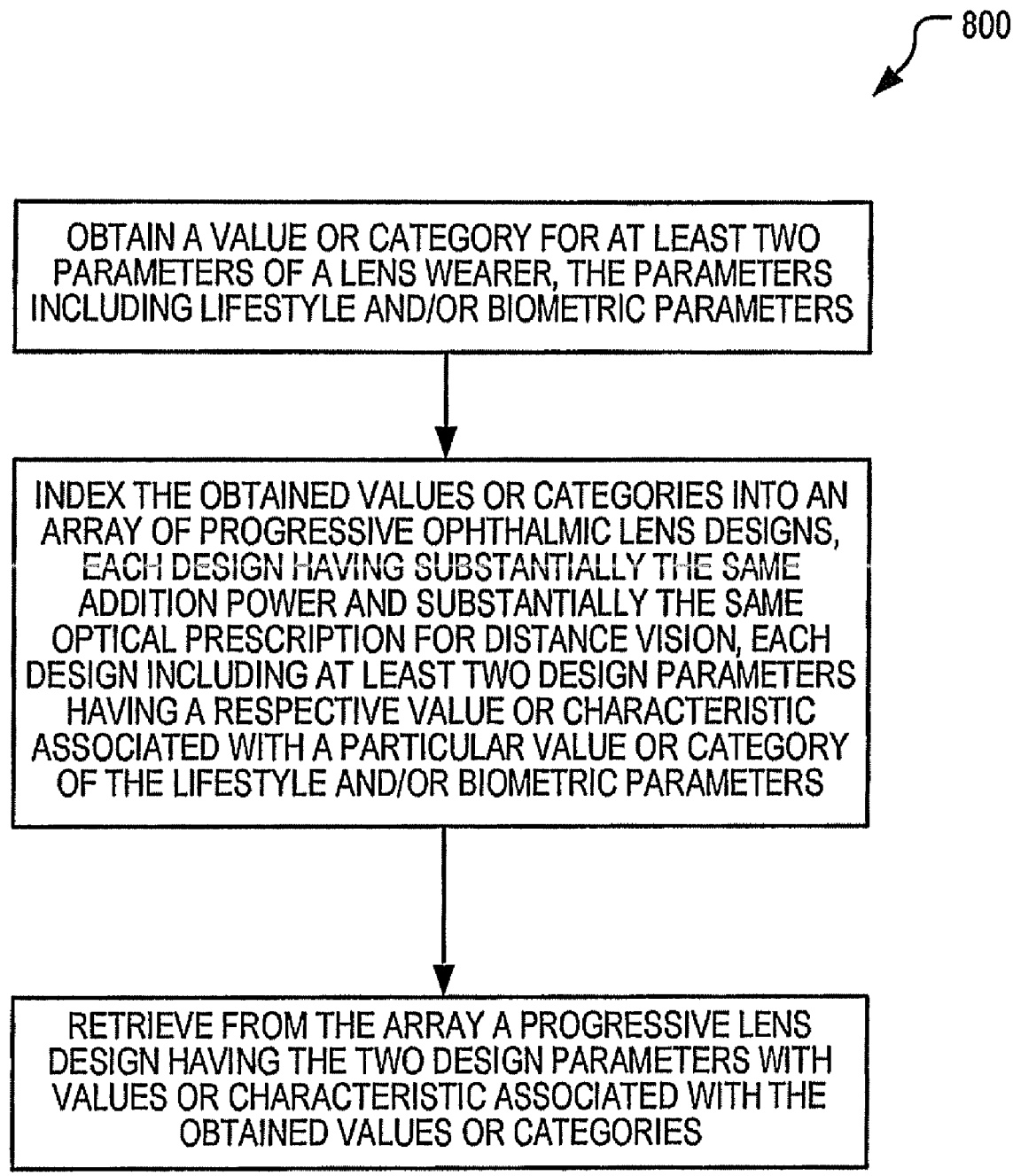
FIG. 8 is a flow diagram of a method in accordance with an embodiment of the present invention.

The indexing into the array results in a retrieval, from the array, of a progressive lens design having at least two lens design parameter values that are associated with respective particular entered values or categories of the lifestyle and biometric parameters of the lens wearer 704. The retrieved lens design is then output via the user output device 712. FIG. 8 shows a simplified flow diagram 800 illustrative of the above-described process.

Finally, it will be understood that there may be other variations and modifications to the configurations described herein that are also within the scope of the present invention.

The invention claimed is:

1. An array of progressive ophthalmic lens elements having substantially the same addition power and substantially the same optical prescription for distance vision, each of the progressive ophthalmic lens elements having a progressive lens design characterised by a set of lens design parameters defining:
   a distance zone providing a refracting power for distance vision;
   a near zone providing a refracting power for near vision; and
   a corridor connecting the distance and near zones, the corridor having a refracting power varying from that of the distance zone to that of the near zone;
   wherein the progressive ophthalmic lens elements provide, for a range of values or categories of at least one lifestyle parameter and at least one biometric parameter of lens wearers, different progressive lens designs in which at least two of the lens design parameters each have a respective value or characteristic attributable to, or associated with, a particular value or category of a respective one of the lifestyle and/or biometric parameters.

2. An array of progressive ophthalmic lens elements according to claim 1 wherein the at least two lens design parameters are selected from the following parameters:
   a. distance-near zone size balance;
   b. corridor length;
   c. near reference point inset (NRP); and
   d. foveal-peripheral zone size balance.

3. An array according to claim 2 wherein each value or characteristic of the at least two lens design parameters is from a respective range of values or characteristics associated with the array.

4. An array according to claim 3 wherein the range of values for the distance-near zone size balance equates to a variation in the absolute angular size of the distance zone and/or the near zone of more than 20°.

5. An array according to claim 3 wherein the range of values for the distance-near zone size balance equates to a variation in the absolute angular size of the distance zone and/or the near zone of more than 30°.

6. An array according to claim 3 wherein a distribution of peripheral blur parameter remains substantially constant throughout the range of variation in the distance-near zone size balance.

7. An array according to claim 3 wherein the range of foveal-peripheral zone size balance values is provided by varying the angular size of the distance zone over a range from about 105° to about 140°.

8. An array according to claim 3 wherein the range of foveal-peripheral zone size balance values is provided by varying the angular size of the near zone over a range from about 40° to about 75°.

9. An array of progressive ophthalmic lens elements according to claim 1 wherein the at least one value or category of the lifestyle parameter of a lens wearer includes a range of values or categories of any one of the lens wearer's:
   a. near vision demand;
   b. dynamic vision demand;
   c. frequency of computer use; and
   d. work and/or leisure patterns of the wearer.

10. An array according to claim 9 wherein the range of values or categories for each of the at least one lifestyle parameters of lens wearers includes a respective range of scores for a population of lens wearers.

11. An array according to claim 10 wherein the distance-near zone size balance of each progressive ophthalmic lens element has a respective value or category attributable to, or associated with, a near vision demand score from a range of lens wearer's near vision demand scores.

12. An array of progressive ophthalmic lens elements according to claim 1 wherein the value or category of the at least one biometric parameter of a lens wearer includes a value or category of any one of a lens wearer's:
   a. monocular interpupillary distance;
   b. reading distance; and
   c. visual behavioural patterns of a wearer, including a wearer's head movement and/or eye movement category during a reading task.

13. An array according to claim 12 wherein the range of values or categories for each of the at least one biometric parameter of the lens wearers includes a respective range of scores.

14. An array according to claim 13 wherein the corridor length of each progressive ophthalmic lens element has a respective value or characteristic attributable to, or associated with, a lens wearer's eye movement score from a range of lens wearer's eye movement scores derived for a population of lens wearers.

15. An array according to claim 13 wherein the foveal zone size balance of each progressive ophthalmic lens element has a respective value or characteristic attributable to, or associated with, a head movement and/or eye movement score from a range of lens wearer's head movement and/or eye movement scores for a population of lens wearers.

16. An array according to claim 13 wherein the near reference point inset of each progressive ophthalmic lens element has a respective value or characteristic attributable to, or associated with, a reading distance score from a range of reading distance scores for a population of lens wearers.

17. An array of progressive ophthalmic lens elements according to claim 1 wherein each progressive ophthalmic lens element contained in the array has substantially the same position of wear (POW) characteristics.

18. An array of progressive ophthalmic lens elements according to claim 17 wherein the position of wear characteristics includes any one of:
   a. corneal back vertex distance;
   b. pantoscopic frame tilt angle;
   c. frame wrap angle.

19. An array of progressive ophthalmic lens elements according to claim 1 wherein each progressive ophthalmic lens element contained in the array includes a progressive lens design in which at least one of the two parameters has at least one value or characteristic that is attributable to size and/or shape information of a frame for supporting the progressive ophthalmic lens elements for wearing by a lens wearer.

20. A series of progressive ophthalmic lens elements having substantially the same optical prescription for distance vision, the ophthalmic lens elements including:
   a distance zone providing a refracting power for distance vision;
   a near zone providing a refracting power for near vision; and
   a corridor connecting the upper and near zones, the corridor having a refracting power varying from that of the distance zone to that of the near zone;
   the series including:
   plural arrays of progressive ophthalmic lens elements, each array within a series containing progressive ophthalmic lens elements having substantially the same addition power and distance vision prescription, progressive ophthalmic lens elements from different arrays of a series having a different addition power;
   wherein the progressive ophthalmic lens elements of each array provide, for a range of values or categories of at least one lifestyle parameter and at least one biometric parameter of lens wearers, different progressive lens designs in which at least two of the lens design parameters each have a respective value or characteristic attributable to, or associated with, a particular value or category of a respective one of the lifestyle and biometric parameters.

21. A series according to claim 20 wherein the difference in the addition power between each array of progressive ophthalmic lens elements within the same series varies incrementally so that the plural arrays within a series provide a range of addition powers.

22. A series according to claim 21 wherein the addition power varies incrementally over a range from 0.75 D to 3.5 D in 0.25 D increments.

23. A matrix of progressive ophthalmic lens elements, the ophthalmic lens elements including:
   a distance zone providing a refracting power for distance vision;
   a near zone providing a refracting power for near vision; and
   a corridor connecting the upper and near zones, the corridor having a refracting power varying from that of the distance zone to that of the near zone;
   the matrix including:
   plural series of progressive ophthalmic lens elements, each series containing one or more arrays of progressive ophthalmic lens elements having substantially the same optical prescription for distance vision, each array within a series containing progressive ophthalmic lens elements having substantially the same addition power, progressive ophthalmic lens elements from different arrays of a series having a different addition power;
   wherein each progressive ophthalmic lens element within an array includes a progressive lens design that includes at least two parameters having a respective value or characteristic that is attributable to, or associated with, a different particular value or category of a respective one of at least one lifestyle parameter and at least one biometric parameter of lens wearers.

24. A method of dispensing a progressive ophthalmic lens for a lens wearer, the method including:
   obtaining a value or category for at least two parameters of a lens wearer, the parameters including at least one lifestyle parameter and at least one biometric parameter;
   indexing the obtained values or categories into an array of progressive ophthalmic lens designs, each design having substantially the same addition power and substantially the same optical prescription for distance vision, each design having at least two lens design parameters having a respective value or characteristic attributable to, or associated with, a different particular value or category of a respective one of the lifestyle and biometric parameters; and
   retrieving from the array a progressive lens design having the two lens design parameters with values or characteristics associated with the obtained values or categories for the lens wearer.

25. A method according to claim 24 wherein the at least two design parameters of the progressive lens design are selected from the following parameters:
   a. distance-near zone size balance;
   b. corridor length;
   c. near reference point inset (NRP); and
   d. foveal-peripheral zone size balance.

26. A method according to claim 24 wherein the value or category of the at least one lifestyle parameter of a lens wearer includes a value or category of any one of a lens wearer's:
   a. near vision demand;
   b. dynamic vision demand;
   c. frequency of computer use; and
   d. work and/or leisure patterns of the wearer.

27. A method according to claim 23 wherein the value or category of the at least one biometric parameter of a lens wearer includes a value or category of any one of a lens wearer's:
   a. monocular interpupillary distance;
   b. reading distance; and
   c. visual behavioural patterns of a wearer, including a wearer's head movement and/or eye movement category during a reading task.

28. A method according to claim 24 wherein each progressive ophthalmic lens element contained in the array has substantially the same position of wear (POW) characteristics of a wearer.

29. A method according to claim 28 wherein the position of wear characteristics includes any one of:
   a. corneal back vertex distance;
   b. pantoscopic frame tilt angle;
   c. frame wrap angle.

30. A method according to claim 24 wherein each progressive ophthalmic lens element contained in the array includes a progressive ophthalmic lens design that includes a parameter having at least one value or characteristic that is attributable to, or associated with, the size and/or shape information of a frame for supporting the progressive ophthalmic lens elements for wearing by a lens wearer.

31. A system for dispensing a progressive ophthalmic lens design for a lens wearer, the system including:
- a processor;
- a memory programmed with instructions for execution by the processor;
- a user input device;
- a user output device; and wherein the instructions are executable by the processor to:
- accept, via the user input device, a value or category for at least two parameters of a lens wearer, the parameters including at least one lifestyle parameter and at least one biometric parameter;
- index the values or categories into an array of progressive ophthalmic lens elements designs having substantially the same addition power and substantially the same optical prescription for distance vision, each design including at least two design parameters having a respective value or characteristic associated with a different particular value or category of the lifestyle and/or biometric parameters;
- retrieve, from the array, the progressive lens design having a progressive lens design including a value for each of the two parameters that is attributable to, or associated with, the entered values or categories of the lifestyle and/or biometric parameters of the lens wearer; and
- output, via the user output device, the selected progressive lens design.

32. A non-transitory computer readable medium storing computer readable data for an array of progressive ophthalmic lens element designs, each design having substantially the same addition power and substantially the same optical prescription for distance vision and including at least two lens design parameters having a respective value or characteristic that is associated with a particular value or category of a lifestyle and/or biometric parameter of lens wearers from a range of values or categories of at least one lifestyle parameter and at least one biometric parameter of lens wearers.

* * * * *